(12) United States Patent
Kim (10) Patent No.: US 12,485,855 B2
(45) Date of Patent: Dec. 2, 2025

(54) APPARATUS FOR TRAVELING ASSISTANCE AND CONTROL METHOD THEREOF

(71) Applicant: HL Klemove Corp., Incheon (KR)

(72) Inventor: Taeryun Kim, Icheon-si (KR)

(73) Assignee: HL Klemove Corp., Incheon (KR)

( * ) Notice: Subject to any disclaimer, the term of this patent is extended or adjusted under 35 U.S.C. 154(b) by 187 days.

(21) Appl. No.: 18/223,842

(22) Filed: Jul. 19, 2023

(65) Prior Publication Data

US 2024/0042972 A1 Feb. 8, 2024

(30) Foreign Application Priority Data

Aug. 3, 2022 (KR) .......................... 10-2022-0096626

(51) Int. Cl.
*B60T 7/12* (2006.01)
*B60T 17/22* (2006.01)

(52) U.S. Cl.
CPC ............... *B60T 7/12* (2013.01); *B60T 17/22* (2013.01); *B60T 2270/40* (2013.01)

(58) Field of Classification Search
CPC ... B60T 7/12; B60T 7/22; B60T 17/22; B60T 2270/40; B60T 8/175; B60W 10/18; B60W 30/09; B60W 40/06; B60W 50/14; B60W 2050/0005; B60W 2050/143; B60W 2050/146; B60W 2420/403; B60W 2552/53; B60W 2554/4029; B60K 35/00; B60K 35/22; B60K 35/28; B60K 35/81; B60R 11/0217; G01S 13/931; G06V 20/588; H04N 23/00

USPC ................................................... 701/23
See application file for complete search history.

(56) References Cited

U.S. PATENT DOCUMENTS

| | | | | |
|---|---|---|---|---|
| 8,615,357 | B2 * | 12/2013 | Simon ................ | G08G 1/165 701/96 |
| 9,463,744 | B2 * | 10/2016 | Schofield .............. | G06V 20/58 |
| 9,469,297 | B2 * | 10/2016 | Akiyama ............... | B60W 30/10 |
| 9,688,273 | B2 * | 6/2017 | Mudalige ........... | B60W 30/0956 |
| 2014/0343792 | A1 * | 11/2014 | Akiyama .............. | B60W 10/184 701/41 |
| 2016/0129840 | A1 * | 5/2016 | Schofield .............. | G01S 13/931 348/148 |
| 2017/0113683 | A1 * | 4/2017 | Mudalige ........... | B60W 30/0956 |
| 2017/0259753 | A1 * | 9/2017 | Meyhofer ............... | B60R 11/04 |
| 2017/0327110 | A1 * | 11/2017 | Inoue ..................... | B60W 10/20 |
| 2019/0051173 | A1 * | 2/2019 | Kang ..................... | B60W 30/09 |

(Continued)

FOREIGN PATENT DOCUMENTS

| | | | | |
|---|---|---|---|---|
| EP | 3988417 A1 * | 4/2022 | ........ B60W 60/0017 |
| JP | 2019015999 A * | 1/2019 | |

(Continued)

*Primary Examiner* — Atul Trivedi
(74) *Attorney, Agent, or Firm* — Harvest IP Law, LLP (57) ABSTRACT

Disclosed is an apparatus for driver assistance. The disclosed apparatus includes a camera that is mounted on a vehicle, is provided to have a field of view outside the vehicle, and provides image data; and a control unit that identifies lane marks on a road surface and a road marking between the lanes based on processing the image data, provides lane information and marking information, and provides a traveling assist deceleration signal for controlling a braking device of the vehicle based on the lane information and the marking information.

20 Claims, 8 Drawing Sheets

(56) References Cited

U.S. PATENT DOCUMENTS

| | | | |
|---|---|---|---|
| 2020/0255008 A1* | 8/2020 | Kim | B62D 1/28 |
| 2021/0188261 A1* | 6/2021 | Song | B60W 40/105 |
| 2021/0339746 A1* | 11/2021 | Yatagai | B60W 10/18 |
| 2022/0032906 A1* | 2/2022 | You | B60W 30/0956 |
| 2022/0172606 A1* | 6/2022 | Pandya | G08G 1/052 |
| 2022/0219691 A1* | 7/2022 | Maleki | G06F 11/0754 |
| 2022/0348227 A1* | 11/2022 | Foster | B60Q 1/507 |
| 2022/0365530 A1* | 11/2022 | Foster | G05D 1/0022 |
| 2023/0115708 A1* | 4/2023 | Xiang | B60W 60/0053 |
| | | | 701/23 |
| 2023/0140569 A1* | 5/2023 | Foster | B60W 30/146 |
| | | | 701/400 |
| 2023/0245564 A1* | 8/2023 | James | H04W 4/44 |
| | | | 701/117 |
| 2023/0280183 A1* | 9/2023 | Hayat | G01C 21/3819 |
| | | | 701/423 |
| 2023/0322214 A1* | 10/2023 | Katayama | B60W 30/09 |
| | | | 701/301 |
| 2024/0212506 A1* | 6/2024 | Li | G06F 3/011 |
| 2024/0218911 A1* | 7/2024 | Yuan | F16D 66/027 |
| 2025/0018912 A1* | 1/2025 | Yuan | B60T 17/22 |
| 2025/0018932 A1* | 1/2025 | Yuan | B60W 10/182 |

FOREIGN PATENT DOCUMENTS

| | | | | | |
|---|---|---|---|---|---|
| JP | 2020033013 | A | * | 3/2020 | |
| JP | 2020201734 | A | * | 12/2020 | |
| KR | 10-2224805 | B1 | | 3/2021 | |
| KR | 10-2316818 | B1 | | 10/2021 | |
| KR | 20210152144 | A | * | 12/2021 | ............ B60W 10/20 |
| WO | WO-2023146618 | A1 | * | 8/2023 | ............ G08G 1/0116 |
| WO | WO-2023146619 | A1 | * | 8/2023 | ............ G08G 1/0116 |

* cited by examiner

APPARATUS FOR TRAVELING ASSISTANCE AND CONTROL METHOD THEREOF

CROSS-REFERENCE TO RELATED APPLICATION

This application claims the benefit of Korean Patent Application No. 10-2022-0096626, filed on Aug. 3, 2022 in the Korean Intellectual Property Office, the disclosure of which is incorporated herein by reference.

BACKGROUND

1. Field

Embodiments of the present disclosure relate to an apparatus for traveling assistance capable of controlling the braking of a vehicle according to identification of road markings displayed on a road surface and a control method thereof.

2. Description of the Related Art

A driver assistance system provided in a vehicle performs various functions for the convenience and safety of a driver. For example, a driver assistance system may detect a preceding or following vehicle and warn of a collision. In addition, the driver assistance system may include an autonomous emergency braking (AEB) system that autonomously performs emergency braking in a case where a collision with another object (for example, a person or another vehicle) is expected. In a case where a collision with another object is expected, the driver assistance system first warns the driver that there is a risk of collision. However, in a case where the driver does not brake despite the warning, the driver assistance system autonomously performs emergency braking.

Various road markings for inducing safe driving are displayed on a road surface. For example, a road marking displayed on a road surface may indicate that there is a crosswalk ahead or that lanes are merging. However, many drivers do not exactly know the meaning of road markings displayed on the road surface. As many drivers ignore the road markings and drive, there is a problem that a risk of collision with another object increases.

SUMMARY

Therefore, it is an aspect of the present disclosure to provide a system capable of generating a traveling assist deceleration signal for braking of a vehicle and changing a warning timing related to autonomous emergency braking (AEB) according to identification of road markings displayed on a road surface, and a control method thereof.

Additional aspects of the disclosure will be set forth in part in the description which follows and, in part, will be obvious from the description, or may be learned by practice of the disclosure.

In accordance with one aspect of the present disclosure, there is provided an apparatus for traveling assistance including a camera mounted on a vehicle, provided to have a field of view outside the vehicle, and configured to provide image data; and a control unit configured to identify lane marks on a road surface and a road marking between the lane marks based on processing the image data, provide lane information and marking information, and provide a traveling assist deceleration signal for controlling a braking device of the vehicle based on the lane information and the marking information.

The control unit may provide the traveling assist deceleration signal based on identifying a diamond-shaped marking indicating a presence of a crosswalk ahead or an inverted triangle marking recommending yield driving in the marking information.

The control unit may change a warning timing related to AEB to a second warning timing that is earlier than a predetermined first warning timing according to the generation of the marking information and control a display of the vehicle such that the display outputs a notification message for notifying a change in the warning timing.

The control unit may identify at least one of a pedestrian or another vehicle in a caution area within a predetermined distance from a position of the road marking based on processing the image data and control the display such that the display outputs a warning message related to the AEB at the second warning timing in response to the identification of at least one of the pedestrian or the other vehicle.

The control unit may change the warning timing back to the predetermined first warning timing based on the vehicle having passed through the caution area.

The control unit may provide an autonomous emergency braking signal based on a collision with at least one of the pedestrian or the other vehicle being predicted after the output of the warning message.

The control unit may determine a crosswalk area, a lane merging area, or an intersection area as the caution area.

The system may further include a radar provided to have a sensing area outside the vehicle and provides radar data, and the control unit may further use the radar data to detect at least one of the pedestrian or the other vehicle.

The control unit may control the display such that the display outputs the notification message including at least one of text or a graphic element.

The control unit may control a speaker of the vehicle such that the speaker outputs a voice notification message for notifying a change in the warning timing.

In accordance with another aspect of the present disclosure, there is provided a method controlling an apparatus for traveling assistance including: acquiring image data by a camera that is mounted on a vehicle and provided to have a field of view outside the vehicle; identifying lane marks on a road surface and a road marking between the lane marks based on processing the image data and providing lane information and marking information; and providing a traveling assist deceleration signal for controlling a braking device of the vehicle according to generation of the lane information and the marking information.

The processing of the image data may include identifying a diamond-shaped marking indicating a presence of a crosswalk ahead or an inverted triangle marking recommending yield driving.

The providing of the traveling assist deceleration signal may include changing a warning timing related to AEB to a second warning timing that is earlier than a predetermined first warning timing according to the generation of the marking information, and the method may further include controlling a display such that the display outputs a notification message for notifying a change in the warning timing.

The processing of the image data may include identifying at least one of a pedestrian or another vehicle in a caution area within a predetermined distance from a position of the road marking, and the controlling of the display may further include outputting a warning message related to the AEB at the second warning timing in response to the identification of at least one of the pedestrian or the other vehicle.

The changing of the warning timing may include changing the warning timing back to the predetermined first warning timing after the vehicle passes through the caution area.

The providing of the traveling assist deceleration signal may include providing an autonomous emergency braking signal in a case where a collision with at least one of the pedestrian or the other vehicle is predicted after the output of the warning message.

The caution area may be determined as a crosswalk area, a lane merging area, or an intersection area.

The method may further include acquiring radar data from a radar provided to have a sensing area toward the surroundings of the vehicle, and detecting at least one of the pedestrian or the other vehicle may be performed by further using the radar data.

The controlling of the display may include outputting the notification message as at least one of text or a graphic element.

The method may further include controlling a speaker provided inside the vehicle such that the speaker outputs a voice notification message for notifying a change in the warning timing.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing operations described is an example; however, the sequence of and/or operations is not limited to that set forth herein and may be changed as is known in the art, with the exception of operations necessarily occurring in a particular order. In addition, respective descriptions of well-known functions and constructions may be omitted for increased clarity and conciseness.

Additionally, exemplary embodiments will now be described more fully hereinafter with reference to the accompanying drawings. The exemplary embodiments may, however, be embodied in many different forms and should not be construed as being limited to the embodiments set forth herein. These embodiments are provided so that this disclosure will be thorough and complete and will fully convey the exemplary embodiments to those of ordinary skill in the art. Like numerals denote like elements throughout.

It will be understood that, although the terms first, second, etc. may be used herein to describe various elements, these elements should not be limited by these terms. These terms are only used to distinguish one element from another. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present.

The terminology used herein is for the purpose of describing particular embodiments only and is not intended to be limiting. As used herein, the singular forms "a," "an," and "the," are intended to include the plural forms as well, unless the context clearly indicates otherwise.

The expression, "at least one of a, b, and c," should be understood as including only a, only b, only c, both a and b, both a and c, both b and c, or all of a, b, and c.

Reference will now be made in detail to the exemplary embodiments of the present disclosure, examples of which are illustrated in the accompanying drawings, wherein like reference numerals refer to like elements throughout.

Figure 1:
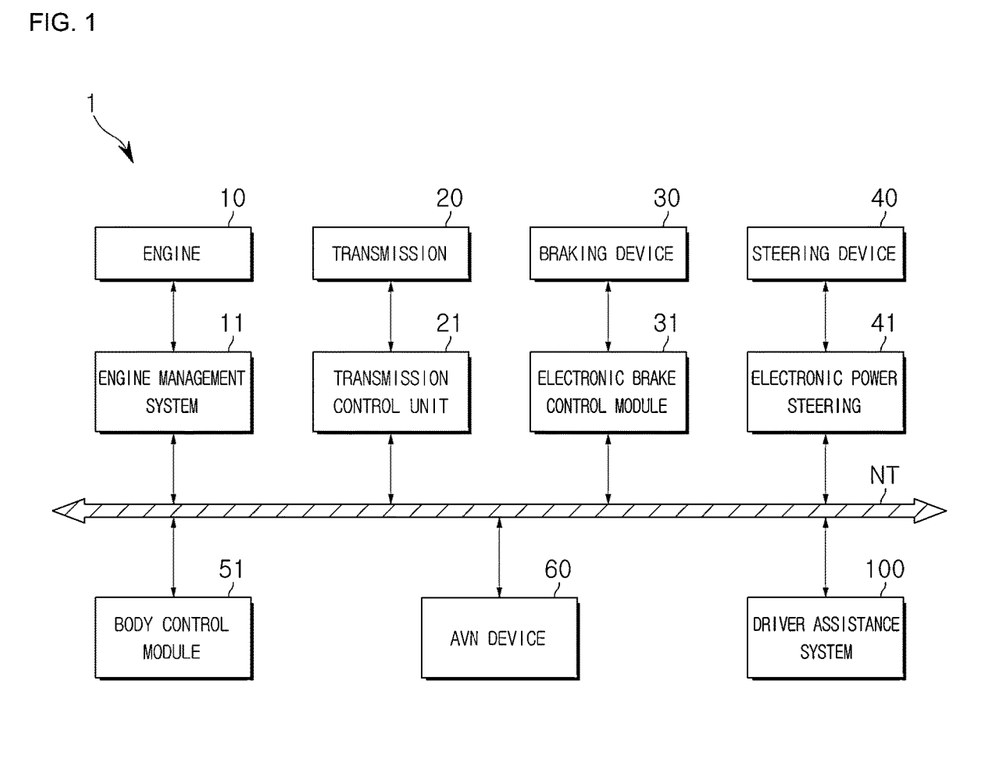
FIG. 1 shows a configuration of a vehicle according to one embodiment.
Figure 2:
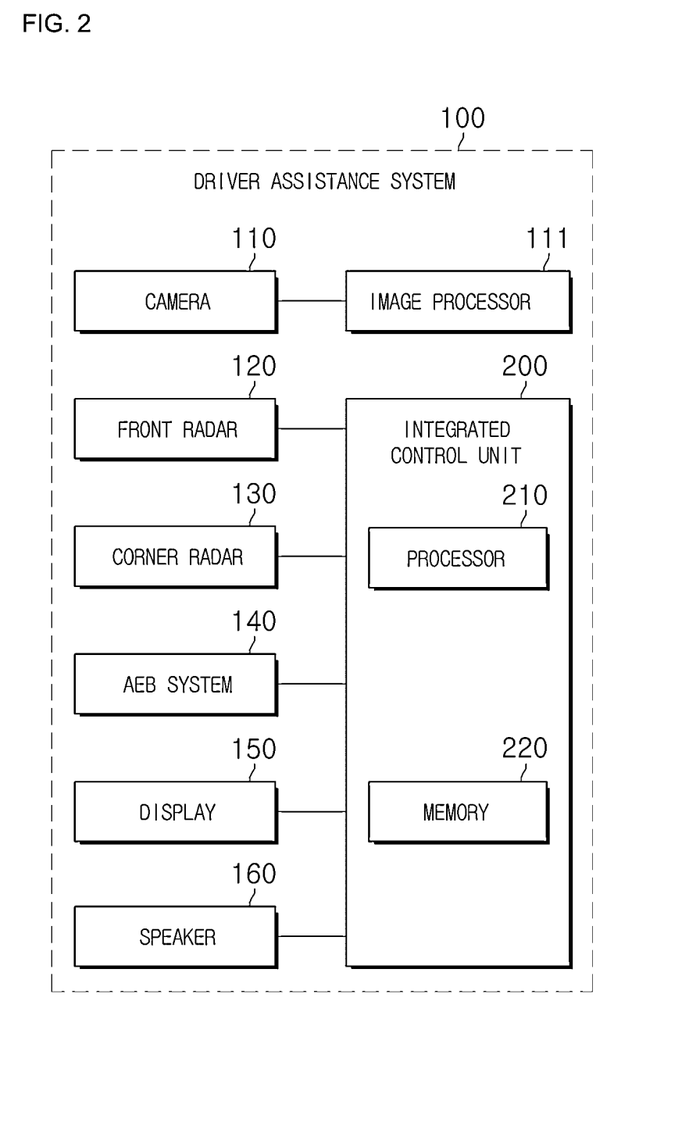
FIG. 2 shows a configuration of a driver assistance system according to one embodiment.

FIG. 1 shows a configuration of a vehicle according to one embodiment. FIG. 2 shows a configuration of a driver assistance system according to one embodiment.

Referring to FIG. 1, a vehicle 1 includes an engine 10, a transmission 20, a braking device 30, and a steering device 40. The engine 10 may generate power for the vehicle 1 to travel. The transmission 20 may include a plurality of gears and may transmit the power generated by the engine 10 to wheels. The braking device 30 may suppress the rotation of the wheels. The braking device 30 may decelerate the vehicle 1 or stop the vehicle 1 through friction with the wheels. The steering device may change a traveling direction of the vehicle 1. The engine 10 may be replaced with a motor.

The vehicle 1 may include a plurality of electric components. For example, the vehicle 1 may include an engine management system (EMS) 11, a transmission control unit (TCU) 21, an electronic brake control module 31, an electronic power steering (EPS) 41, a body control module (BCM) 51, an audio video navigation (AVN) device 60, and a driver assistance system (DAS) 100.

The EMS 11 may control the engine 10 in response to a driver's intention to accelerate through an accelerator pedal or a request from the DAS 100. For example, the EMS 11 may control the torque of the engine 10. The TCU 21 may control the transmission 20 in response to a driver's shift command through a shift lever and/or a traveling speed of the vehicle 1. For example, the TCU 21 may adjust a transmission ratio from the engine 10 to the wheels. In a case where the vehicle 1 is an electric vehicle driven by a battery and a motor, the engine 10, the transmission the EMS 11, and the TCU 21 may be excluded from constituent elements of the vehicle 1.

The electronic brake control module 31 may control the braking device 30 in response to a driver's intention to brake through a braking pedal and/or a slip of the wheels. For example, when an anti-lock braking system (ABS) operates, the electronic brake control module 31 may temporarily release braking of the wheels in response to a slip of the wheels detected when the vehicle 1 is braked. When an electronic stability control (ESC) system operates, the electronic brake control module 31 may selectively release braking of the wheels in response to oversteering and/or understeering detected when the vehicle 1 is steered. In addition, when a traction control system (TCS) operates, the electronic brake control module 31 may temporarily brake the wheels in response to a slip of the wheels detected when the vehicle 1 is driven.

The EPS 41 may assist operation of the steering device 40 such that a driver may easily manipulate a steering wheel in response to a driver's intention to steer through the steering wheel. For example, the EPS 41 may assist operation of the steering device 40 such that the steering device 40 reduces a steering force during low-speed driving or parking and increases a steering force during high-speed driving.

The BCM 51 may control operations of the electric components that provide convenience to the driver or ensure the safety of the driver. For example, the BCM 51 may control head lamps, wipers, a cluster, multi-function switches, and direction indicator lamps.

The AVN device 60 may be provided in a center fascia of the vehicle 1. The AVN device 60 may include a display and an audio device. Further, speakers installed in a dashboard and doors of the vehicle 1 may be understood to be included in the AVN device 60. The display may output a screen, and the audio device may output sound. The display may display a graphical user interface (GUI) capable of interacting with a user.

The display of the AVN device 60 may be a light emitting diode (LED) panel, an organic light emitting diode (OLED) panel, or a liquid crystal display panel.

The AVN device 60 may include various input buttons. Further, the display of the AVN device 60 may include a touch panel. The AVN device 60 may execute various functions based on a user command input through the input buttons or the touch panel. For example, the AVN device 60 may perform a navigation function, a DMB function, an audio function, and/or a video function.

The DAS 100 may assist the driver in manipulating (driving, braking, and/or steering) the vehicle 1. For example, the DAS 100 may detect an environment around the vehicle 1 (for example, other vehicles, pedestrians, cyclists, lane marks, road markings, road signs, and the like) and may control the driving, braking, and/or steering of the vehicle 1 in response to the detected environment.

The DAS 100 may provide various assistance functions. For example, the DAS 100 may provide a lane departure warning (LDW) function, a lane keeping assist (LKA) function, a lane following assist (LFA) function, a high beam assist (HBA) function, an AEB function, a traffic sign recognition (TSR) function, a smart cruise control (SCC) function, and/or a blind spot detection (BSD) function.

The above electric components may communicate with each other through a vehicle communication network NT. For example, the electric components may transmit and receive data via Ethernet, media oriented systems transport (MOST), Flexray, a controller area network (CAN), and/or a local interconnect network (LIN). For example, the DAS 100 may transmit a braking signal and a steering signal to the electronic brake control module 31 and the EPS 41 through the vehicle communication network NT.

Referring to FIG. 2, the DAS 100 may include a camera 110, an image processor 111, a front radar 120, a corner radar 130, an AEB system 140, a display 150, a speaker 160, and an integrated control unit 200. The integrated control unit 200 may be electrically connected to the DAS 100 and the constituent elements of the vehicle 1 and may control the constituent elements.

Each of the camera 110, the front radar 120, the corner radar 130, and the AEB system 140 may include an electronic control unit (ECU). The integrated control unit 200 may include the ECU of the camera 110, the ECU of the front radar 120, the ECU of the corner radar 130, and the ECU of the AEB system 140.

The camera 110 may photograph a view from the front of the vehicle 1 and acquire image data. The camera 110 may be mounted on a windshield (front glass) of the vehicle 1. The image processor 111 may process the image data to identify objects such as other vehicles, pedestrians, cyclists, lane marks, road markings, road structures, and road signs. The camera 110 may include a plurality of lenses and an image sensor. The image sensor may include a plurality of photodiodes that convert light into electrical signals, and the plurality of photodiodes may be disposed in a two-dimensional matrix.

The camera 110 may be electrically connected to the image processor 111. For example, the camera 110 may be connected to the image processor 111 through the vehicle communication network NT, a hard wire, and/or a printed circuit board (PCB). The camera 110 may transmit the image data of the view from the front of the vehicle 1 to the image processor 111. The image processor 111 may be electrically connected to the integrated control unit 200.

The front radar 120 and the corner radar 130 may each acquire radar data. The integrated control unit 200 may process the radar data to detect relative positions and relative speeds of objects around the vehicle 1 (for example, other vehicles, pedestrians, cyclists, and the like). The front radar 120 and the corner radar 130 may be connected to the integrated control unit 200 through the vehicle communication network NT, a hard wire, or a printed circuit board. The radars may be implemented as lidars.

In addition, various sensors may be provided in the vehicle 1. For example, the vehicle 1 may include a speed sensor for detecting a speed, a yaw rate sensor for detecting a change in angular velocity, a gyro sensor for detecting an inclination, and/or a steering angle sensor for detecting the rotation and steering angle of a steering wheel.

The AEB system 140 may autonomously perform emergency braking in a case where a collision with another object (for example, a person or another vehicle) is expected while the vehicle 1 is traveling. The DAS 100 may first warn the driver that there is a risk of collision in a case where another object is present in the traveling direction of the vehicle 1 (for example, an area in front of the vehicle or a lateral area in front of the vehicle). However, in a case where the driver does not brake at an appropriate timing despite the warning, the DAS 100 may control the AEB system 140 such that the AEB system 140 autonomously performs emergency braking.

The display 150 may be provided at various positions inside the vehicle 1. For example, the display 150 may be provided in a cluster, a center fascia, and/or a dashboard. The display 150 may display information related to operation of the DAS 100 and/or operation of the vehicle 1. The display 150 may display a GUI capable of interacting with a user. The display 150 may be integrally provided with a touch panel and may receive a touch input for manipulating the GUI from a user.

The speaker 160 may output auditory information related to operation of the DAS 100 under the control of the integrated control unit 200. For example, the speaker 160 may output a voice notification message for notifying a change in warning timing related to the AEB. In addition, the speaker 160 may output a warning sound for notifying that attention should be paid to the front in relation to the AEB.

The integrated control unit 200 may include a processor 210 and a memory 220. In addition, the integrated control unit 200 may include one or more processors 210. The one or more processors 210 included in the integrated control unit 200 may be integrated into one control circuit or physically separated. Further, the processor 210 and the memory 220 may be implemented as a single chip.

The processor 210 may process the image data processed by the image processor 111, the front radar data from the front radar 120, and the corner radar data from the corner radar 130. In addition, the processor 210 may generate a braking signal for controlling the braking device 30 and an AVN signal for controlling the AVN device 60. The processor 210 may generate control signals for controlling the DAS 100 and the constituent elements of the vehicle 1.

The memory 220 may store data to be processed by the image processor 111 and the processor 210, and programs, software, applications, and/or instructions to be executed by the processor 210. For example, the memory 220 may store programs and/or data for processing the image data and/or the radar data. Further, the memory 220 may store programs and/or data for the processor 210 to generate control signals related to the DAS 100 and the components of the vehicle 1.

The memory 220 may temporarily store the image data received from the camera 110 and/or the radar data received from the radars 120 and 130. In addition, the memory 220 may temporarily store a result of processing the image data and/or radar data by the processor 210. The memory 220 may include not only volatile memories such as an S-RAM and a D-RAM, but also non-volatile memories such as a flash memory, a read only memory (ROM), and an erasable programmable read only memory (EPROM).

The image processor 111 may identify and distinguish lane marks and a road marking between the lane marks from the image data acquired from the camera 110. The image processor 111 may generate lane information and marking information based on the identification of the lane marks and the road marking. The road marking may refer to a sign displayed on a road surface to induce deceleration.

The integrated control unit 200 may generate a traveling assist deceleration signal for controlling the braking device 30 according to the generation of lane information and marking information. The integrated control unit 200 may change the warning timing related to the AEB based on the generation of marking information. The integrated control unit 200 may control the display 150 such that the display 150 outputs a notification message for notifying a change in warning timing related to the AEB. The notification message may include at least one of text or a graphic element. In addition, the integrated control unit 200 may control the speaker 160 such that the speaker 160 outputs the voice notification message for notifying a change in warning timing related to the AEB.

For example, the integrated control unit 200 may generate the traveling assist deceleration signal based on the identification of a diamond-shaped marking indicating the presence of a crosswalk ahead or an inverted triangle marking guiding yield driving in the marking information. The braking device 30 may perform braking for deceleration of the vehicle 1 in response to the traveling assist deceleration signal transmitted from the integrated control unit 200. That is, the DAS 100 may reduce the speed of the vehicle 1 to a predetermined safe speed in a case where the road marking is present in front of the vehicle 1.

In addition, the integrated control unit 200 may change the warning timing related to the AEB to a second warning timing that is earlier than a predetermined first warning timing according to the generation of marking information. The predetermined first warning timing may be determined at the time of designing the AEB system 140 or set by the driver. A time interval between the first warning timing and the second warning timing may also be determined at the time of designing the AEB system 140 or set by the driver.

The road markings displayed on the road surface are not limited to the diamond-shaped marking and the inverted triangle marking. For example, the marking information may be generated as road markings such as a triangular marking indicating an uphill slope or a zigzag marking indicating an area with frequent accidents are detected.

The image processor 111 may identify at least one of a pedestrian or another vehicle in a caution area within a predetermined distance from the position of the road marking. The caution area may include a crosswalk area, a lane merging area, and/or an intersection area located within a predetermined distance from the position of the road marking.

The integrated control unit 200 may control the display 150 such that the display 150 outputs a warning message at the changed warning timing (that is, the second warning timing) based on detection of at least one of the pedestrian or the other vehicle in the caution area. The warning message may include at least one of text or a graphic element. The integrated control unit 200 may further use the radar data acquired from the radars 120 and 130 to detect at least one of the pedestrian or the other vehicle.

The integrated control unit 200 may generate an autonomous emergency braking signal in a case where a collision with at least one of the pedestrian or the other vehicle is predicted after the output of the warning message. The AEB system 140 may control the braking device 30 to bring the vehicle 1 to a complete stop in response to the autonomous emergency braking signal.

Another object may leave the caution area before the vehicle 1 enters the caution area. In this case, it may be determined that there is no risk of collision between the vehicle 1 and another object, and the vehicle 1 may pass through the caution area without completely stopping. The integrated control unit 200 may change the warning timing related to the AEB back to the predetermined first warning timing after the vehicle 1 passes through the caution area.

As described above, the disclosed DAS system 100 may generate the traveling assist deceleration signal when a road marking inducing deceleration of the vehicle 1 is identified, advance the warning timing related to the AEB, and provide the warning message at the advanced timing when another object is detected in the traveling direction of the vehicle 1. Accordingly, the driver may quickly recognize a collision risk situation and may quickly respond to the collision risk situation. In addition, when the change of the warning timing related to the AEB is notified to the driver, the driver's attention may be improved, and the driver's sense of discomfort about the change in execution timing of the AEB may be reduced.

Figure 3:
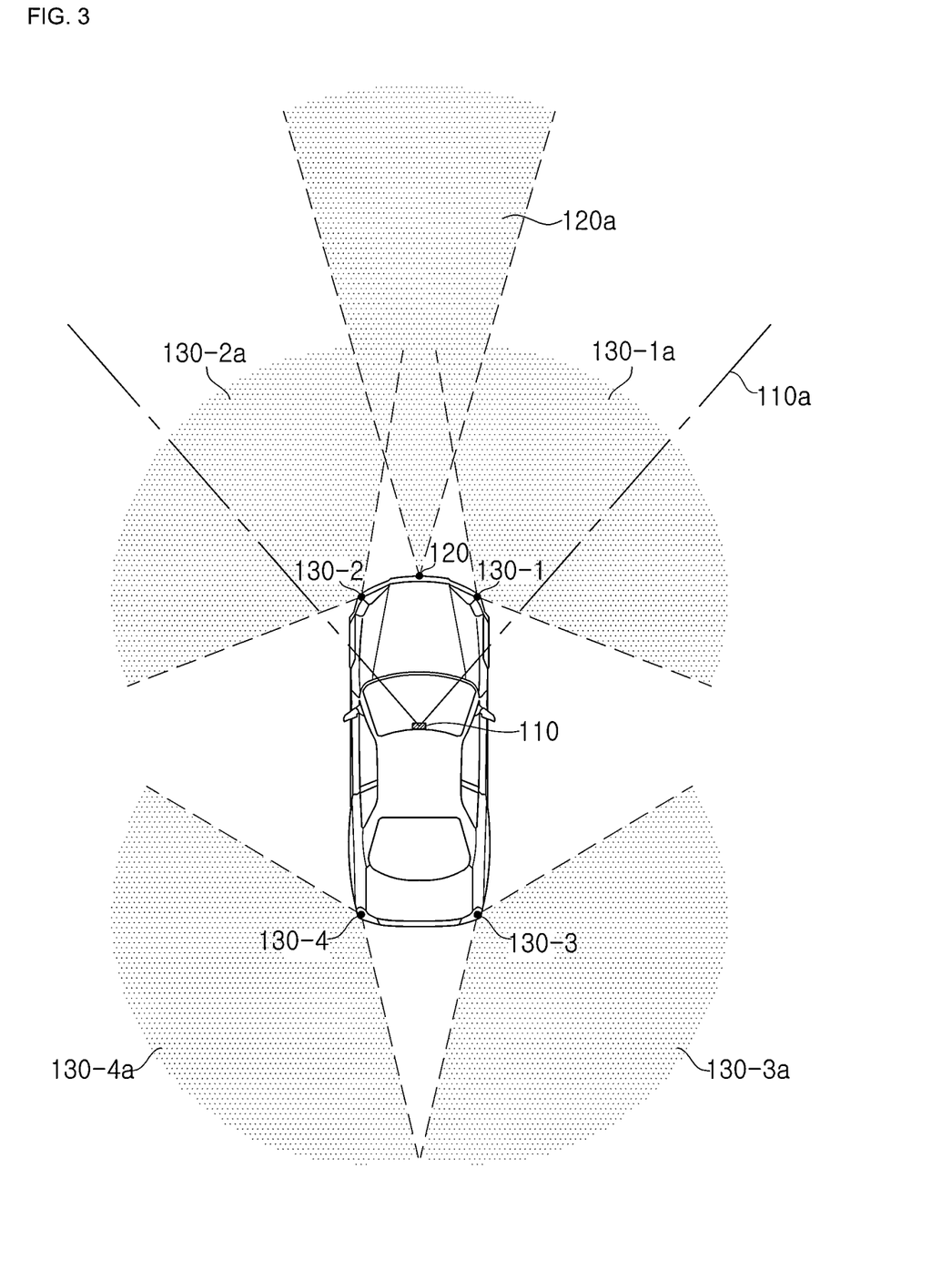
FIG. 3 shows a camera and radars provided in the vehicle.

FIG. 3 shows the camera and the radars provided in the vehicle.

Referring to FIG. 3, the camera 110 may have a field of view 110a toward the area in front of the vehicle 1. For example, the camera 110 may be installed on a front windshield of the vehicle 1. The camera 110 may photograph a view from the front of the vehicle 1 and acquire image data of the view from the front of the vehicle 1. The image data of the view from the front of the vehicle 1 may include location information about other vehicles, pedestrians, cyclists, lane marks, or road markings located in front of the vehicle 1.

The front radar 120 may have a sensing area 120a toward the area in front of the vehicle 1. For example, the front radar 120 may be installed on a grill or a bumper of the vehicle 1. The front radar 120 may radiate transmission radio waves toward the area in front of the vehicle 1 and receive reflected radio waves reflected from an object.

The front radar 120 may acquire front radar data from the reflected radio waves. For example, the front radar data may include distance information and speed information about other vehicles, pedestrians, or cyclists located in front of the vehicle 1. The front radar 120 may calculate a relative distance to the object based on a phase difference (or a time difference) between the transmission radio waves and the reflected radio waves and calculate a relative speed of the object based on a frequency difference between the transmission radio waves and the reflected radio waves.

The corner radar 130 may include a first corner radar 130-1 installed on a front right side of the vehicle 1, a second corner radar 130-2 installed on a front left side of the vehicle 1, and a third corner radar 130-3 installed on a rear right side of the vehicle 1, and a fourth corner radar 130-4 installed on a rear left side of the vehicle 1.

The first corner radar 130-1 may have a sensing area 130-1a toward a right area in front of the vehicle 1. The second corner radar 130-2 may have a sensing area 130-2a toward a left area in front of the vehicle 1, the third corner radar 130-3 may have a sensing area 130-3a toward a right area behind the vehicle 1, and the fourth corner radar 130-4 may have a sensing area 130-4a toward a left area behind the vehicle 1.

Each of the corner radars 130 may include a transmission antenna and a reception antenna. The first, second, third, and fourth corner radars 130-1, 130-2, 130-3, and 130-4 may acquire first corner radar data, second corner radar data, third corner radar data, and fourth corner radar data, respectively. The first corner radar data may include distance information and speed information of an object located in the right area in front of the vehicle 1. The second corner radar data may include distance information and speed information of an object located in the left area in front of the vehicle 1. The third and fourth corner radar data may include distance information and speed information of objects located in the right area behind of the vehicle 1 and in the left area behind of the vehicle 1.

The integrated control unit 200 may identify objects (for example, other vehicles, pedestrians, cyclists, lane marks, road markings, road structures, and road signs) in front of the vehicle 1 based on at least one of front image data of the camera 110 or front radar data of the front radar 120. The integrated control unit 200 may acquire location information (a distance and direction) and speed information (a relative speed) of the objects in front of the vehicle 1 based on at least one of the front image data of the camera 110 or the front radar data of the front radar 120. In addition, the integrated control unit 200 may acquire location information (a distance and direction) and speed information (a relative speed) of the objects in the lateral areas (the front right area, the front left area, the rear right area, and the rear left area) of the vehicle 1 based on the corner radar data of the plurality of corner radars 130.

Figure 4:
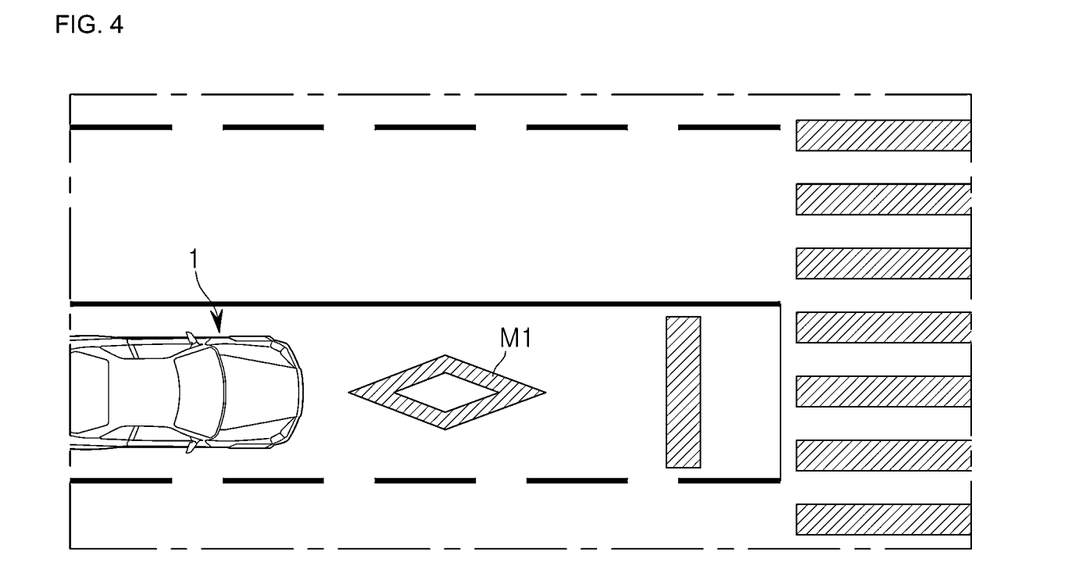
FIG. 4 shows a diamond-shaped marking displayed on a road surface.
Figure 5:
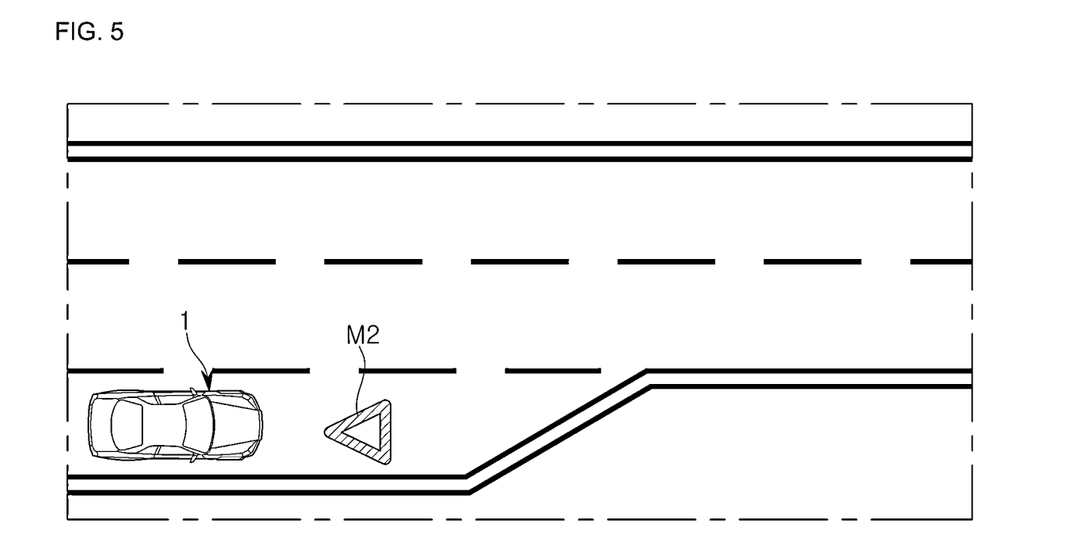
FIG. 5 shows an inverted triangle marking displayed on a road surface.

FIG. 4 shows a diamond-shaped marking displayed on the road surface. FIG. 5 shows an inverted triangle marking displayed on the road surface.

There are various road markings on the road surface. Road markings are displayed on the road surface to provide information to drivers and induce safe driving. However, many drivers do not exactly know the meaning of road markings displayed on the road surface. Accidents may occur as drivers ignore road markings displayed on the road surface and drive.

Referring to FIG. 4, a diamond-shaped marking M1 displayed on the road surface predicts the presence of a crosswalk ahead. In general, the crosswalk may be located 60 m behind the diamond-shaped marking M1. The diamond-shaped marking M1 may be located just before the crosswalk. The diamond-shaped marking M1 provides a warning to the driver that the vehicle 1 should slow down to watch out for pedestrians.

The image processor 111 of the DAS 100 may identify the diamond-shaped marking M1 from the image data acquired from the camera 110 and generate marking information. The integrated control unit 200 may generate a traveling assist deceleration signal based on the marking information generated through the identification of the diamond-shaped marking M1. In addition, the integrated control unit 200 may change the warning timing related to the AEB to a second warning timing that is earlier than a predetermined first warning timing based on the generation of marking information.

In a case where a pedestrian is identified in the crosswalk area that is a caution area, the integrated control unit 200 may control the display 150 such that the display 150 outputs a warning message related to the AEB at the changed (second) warning timing. The integrated control unit 200 may change the warning timing related to the AEB back to the predetermined first warning timing after the vehicle 1 passes through the crosswalk area within a predetermined distance from the position of the diamond-shaped marking M1. That is, when the vehicle 1 passes through the crosswalk area, the warning timing related to the AEB may be reset to a default value. The default value of the warning timing may be determined at the time of designing or set by the driver.

Referring to FIG. 5, an inverted triangle marking M2 guides a point where lanes merge or a point where lanes narrow. A lane merging area or an intersection area may be present behind the inverted triangle marking M2. In a case where the vehicle 1 is traveling along a lane marked with the inverted triangle marking M2, it is safe for the vehicle 1 to enter a main road or the next lane after another vehicle traveling on the main road or the next lane has passed. That is, the inverted triangle marking M2 recommends yield driving.

The image processor 111 of the DAS 100 may identify the inverted triangle marking M2 from the image data acquired from the camera 110 and generate marking information. The integrated control unit 200 may generate a traveling assist deceleration signal based on the marking information generated through the identification of the inverted triangle marking M2. In addition, the integrated control unit 200 may change the warning timing related to the AEB to a second warning timing that is earlier than a predetermined first warning timing based on the generation of marking information.

In a case where another vehicle is identified in the lane merging area that is a caution area, the integrated control unit 200 may control the display 150 such that the display 150 outputs a warning message related to the AEB at the changed (second) warning timing. The integrated control unit 200 may change the warning timing related to the AEB back to the predetermined first warning timing after the vehicle 1 passes through the lane merging area within a predetermined distance from the position of the inverted triangle marking M2.

In FIGS. 4 and 5, the integrated control unit 200 may generate an autonomous emergency braking signal in a case where a collision between at least one of the pedestrian or the other vehicle and the vehicle 1 is predicted after the output of the warning message. The AEB system 140 may control the braking device 30 to bring the vehicle 1 to a complete stop in response to the autonomous emergency braking signal. A collision with another object may be prevented by emergency braking of the vehicle 1.

Figure 6:
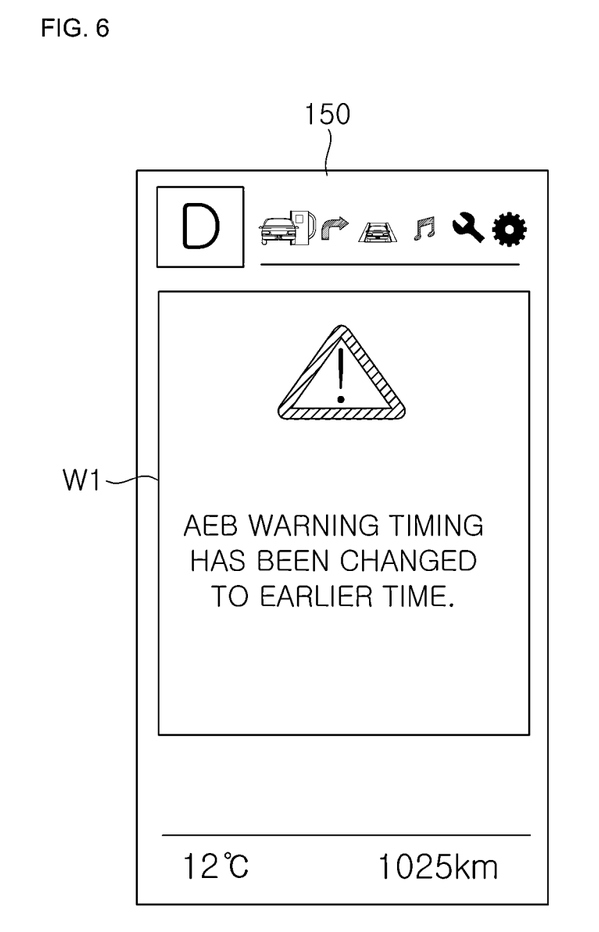
FIG. 6 illustrates an example in which a notification message for notifying a change in warning timing related to AEB is provided through a display.
Figure 7:
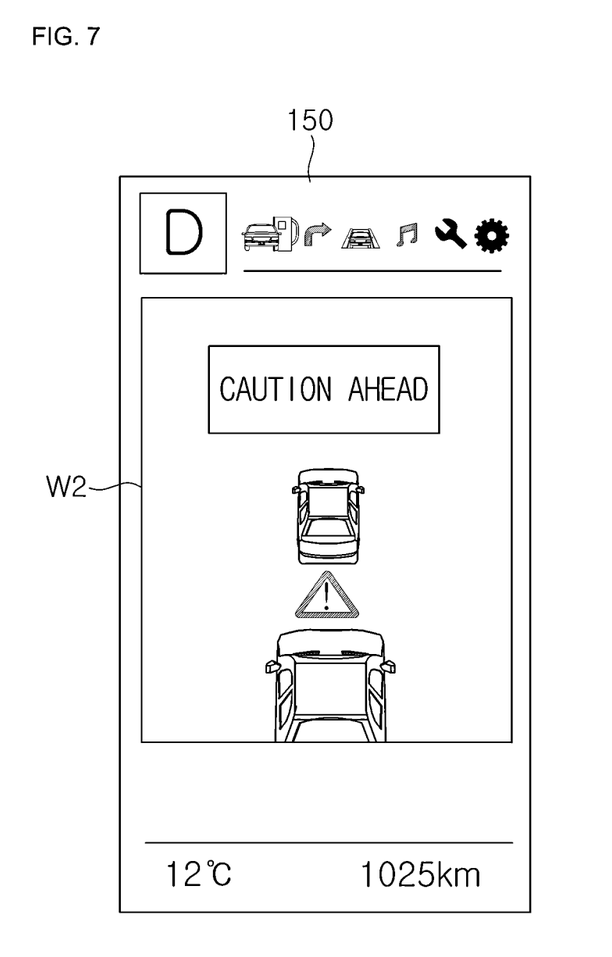
FIG. 7 illustrates an example in which a warning message related to AEB is provided in a case where a collision with another object is expected.

FIG. 6 illustrates an example in which a notification message for notifying a change in warning timing related to the AEB is provided through the display. FIG. 7 illustrates an example in which a warning message related to the AEB is provided in a case where a collision with another object is expected.

Referring to FIG. 6, the integrated control unit 200 of the DAS 100 may control the display 150 such that the display 150 outputs a notification message W1 for notifying a change in warning timing related to the AEB. The notification message W1 may include text such as "an AEB warning timing has been changed to an earlier time." In addition, the notification message W1 may include a graphic element represented by a figure and a symbol. In this way, when the change of the warning timing related to the AEB is notified to the driver, the driver's attention may be improved, and the driver's sense of discomfort about the change in execution timing of the AEB may be reduced.

Referring to FIG. 7, the integrated control unit 200 of the DAS 100 may control the display 150 such that the display 150 outputs a warning message W2 at the changed warning timing (that is, the second warning timing) based on detection of at least one of the pedestrian or the other vehicle in the caution area within a predetermined distance from the position of the road marking. The warning message W2 may include text such as 'caution ahead.' Further, the warning message W2 may include a graphic element represented by an image, a figure, and a symbol of the object ahead. In this way, the disclosed DAS 100 may reduce accidents by providing the warning message at the advanced warning timing when a collision is expected.

Figure 8:
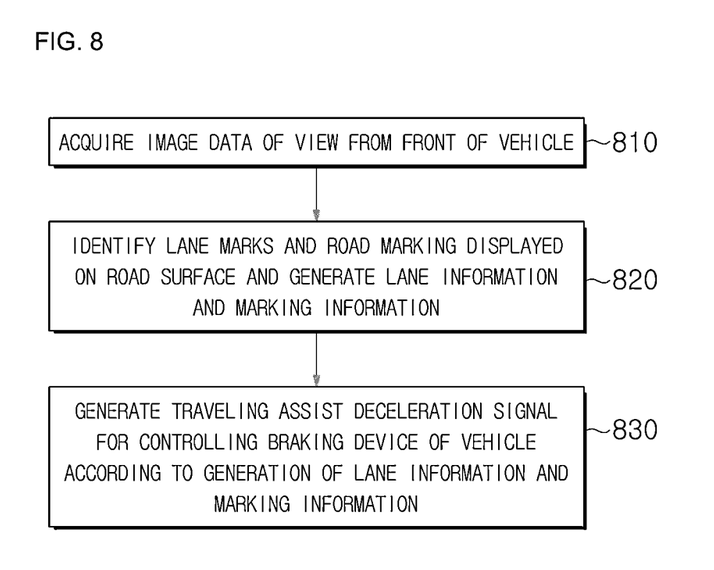
FIG. 8 is a flowchart illustrating a control method of a driver assistance system according to one embodiment.
Figure 9:
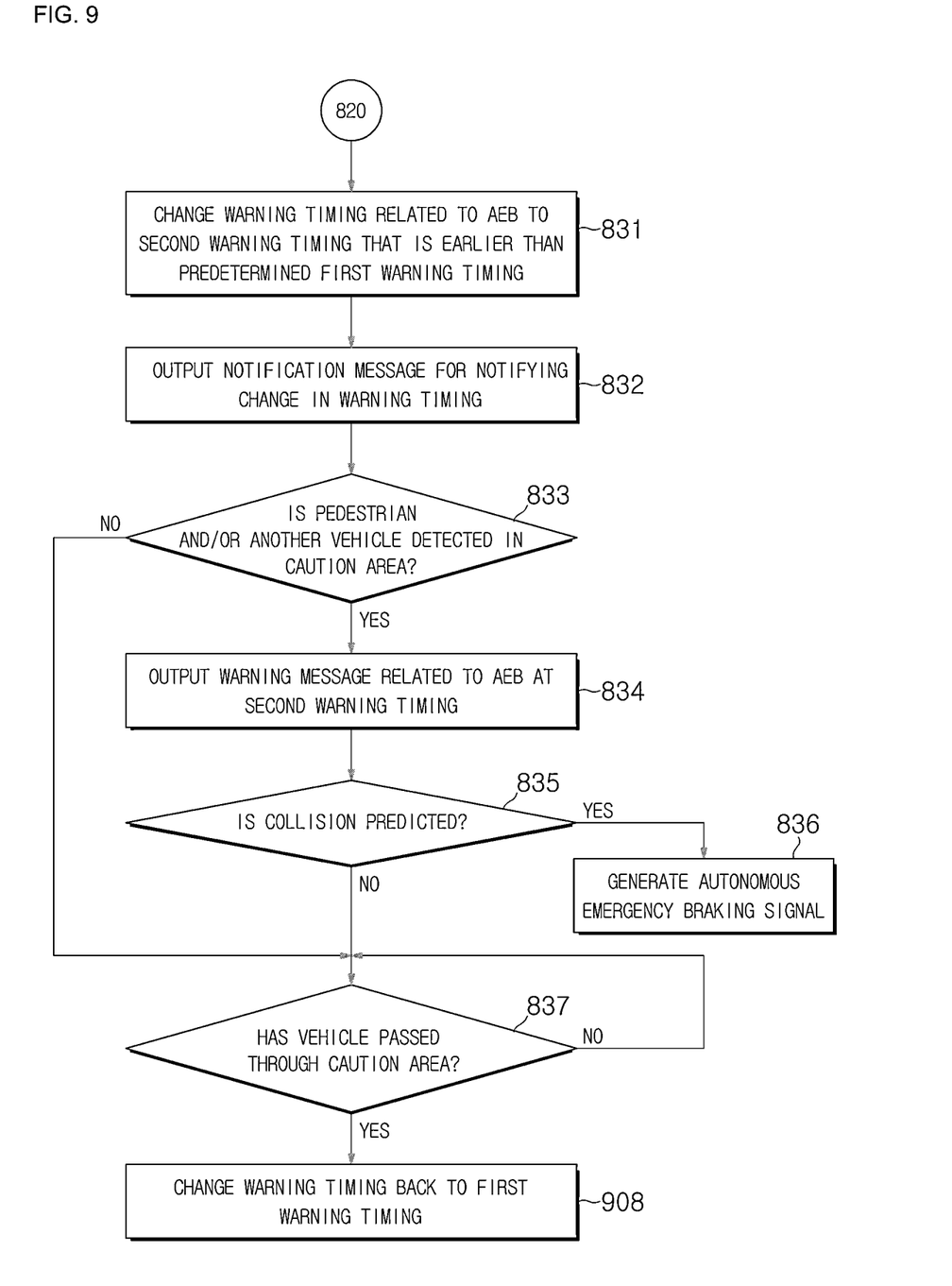
FIG. 9 is a flowchart illustrating the control method of a driver assistance system described in FIG. 8 in more detail.

FIG. 8 is a flowchart illustrating a control method of a DAS according to one embodiment. FIG. 9 is a flowchart illustrating the control method of a DAS described in FIG. 8 in more detail.

Referring to FIG. 8, the image processor 111 of the DAS 100 may acquire image data of the view from the front of the vehicle 1 from the camera 110 (810). The image processor 111 may identify and distinguish lane marks and a road marking between the lane marks from the image data acquired from the camera 110. The image processor 111 may generate lane information and marking information based on the identification of the lane marks and the road marking (820). The road marking may refer to a sign displayed on a road surface to induce deceleration. For example, the image processor 111 may identify a diamond-shaped marking indicating the presence of a crosswalk ahead or an inverted triangle marking guiding yield driving from the image data.

The integrated control unit 200 may generate a traveling assist deceleration signal for controlling the braking device 30 according to the generation of lane information and marking information (830). The braking device 30 may perform braking for deceleration of the vehicle 1 in response to the traveling assist deceleration signal transmitted from the integrated control unit 200. That is, the DAS 100 may reduce the speed of the vehicle 1 to a predetermined safe speed in a case where the road marking is present in front of the vehicle 1.

Referring to FIG. 9, the traveling assist deceleration signal may include a warning timing change signal related to the AEB. The AEB system 140 may change the warning timing related to the AEB in response to the warning timing change signal. The integrated control unit 200 may control the display 150 such that the display 150 outputs a notification message for notifying a change in warning timing related to the AEB.

The integrated control unit 200 may change the warning timing related to the AEB to a second warning timing that is earlier than a predetermined first warning timing based on the generation of marking information (831). In addition, the integrated control unit 200 may control the display 150 such that the display 150 outputs a notification message for notifying a change in warning timing related to the AEB (832). A voice notification message may be output through the speaker 160.

The image processor 111 may detect at least one of a pedestrian or another vehicle in a caution area within a predetermined distance from the position of the road marking (833). The detection of another object such as a pedestrian or another vehicle may be performed using radar data. The integrated control unit 200 may control the display 150 such that the display 150 outputs a warning message at the changed warning timing (that is, the second warning timing) based on detection of at least one of the pedestrian or the other vehicle in the caution area (834). A voice warning message may be output through the speaker 160.

The integrated control unit 200 may monitor a risk of collision with another object (835). The integrated control unit 200 may generate an autonomous emergency braking signal in a case where a collision between at least one of the pedestrian or the other vehicle and the vehicle 1 is predicted after the output of the warning message (836). The AEB system 140 may control the braking device 30 to bring the vehicle 1 to a complete stop in response to the autonomous emergency braking signal. A collision with another object may be prevented by emergency braking of the vehicle 1.

Another object may leave the caution area before the vehicle 1 enters the caution area. In this case, it may be determined that there is no risk of collision between the vehicle 1 and another object, and the vehicle 1 may pass through the caution area without completely stopping. The integrated control unit 200 may change the warning timing related to the AEB back to the predetermined first warning timing after the vehicle 1 passes through the caution area (837, 838).

As described above, the disclosed DAS and control method thereof can identify and distinguish lane marks and a road marking displayed on a road surface and generate a traveling assist deceleration signal for controlling a braking device of a vehicle according to the identification of the lane marks and the road marking.

In addition, the DAS and the control method thereof can change the warning timing related to the AEB according to the identification of the lane marks and the road marking. Therefore, it is possible to induce safe driving of the driver and reduce the occurrence of an accident.

The disclosed DAS and control method thereof can identify and distinguish lane marks and a road marking displayed on a road surface and generate a traveling assist deceleration signal for controlling a braking device of a vehicle according to the identification of the lane marks and the road marking.

In addition, the DAS and the control method thereof can change the warning timing related to the AEB according to the identification of the lane marks and the road marking. Therefore, it is possible to induce safe driving of the driver and reduce the occurrence of an accident.

Exemplary embodiments of the present disclosure have been described above. In the exemplary embodiments described above, some components may be implemented as a "module". Here, the term 'module' means, but is not limited to, a software and/or hardware component, such as a Field Programmable Gate Array (FPGA) or Application Specific Integrated Circuit (ASIC), which performs certain tasks. A module may advantageously be configured to reside on the addressable storage medium and configured to execute on one or more processors.

Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The operations provided for in the components and modules may be combined into fewer components and modules or further separated into additional components and modules. In addition, the components and modules may be implemented such that they execute one or more CPUs in a device.

With that being said, and in addition to the above described exemplary embodiments, embodiments can thus be implemented through computer readable code/instructions in/on a medium, e.g., a computer readable medium, to control at least one processing element to implement any above described exemplary embodiment. The medium can correspond to any medium/media permitting the storing and/or transmission of the computer readable code.

The computer-readable code can be recorded on a medium or transmitted through the Internet. The medium may include Read Only Memory (ROM), Random Access Memory (RAM), Compact Disk-Read Only Memories (CD-ROMs), magnetic tapes, floppy disks, and optical recording medium. Also, the medium may be a non-transitory computer-readable medium. The media may also be a distributed network, so that the computer readable code is stored or transferred and executed in a distributed fashion. Still further, as only an example, the processing element could include at least one processor or at least one computer processor, and processing elements may be distributed and/or included in a single device.

While exemplary embodiments have been described with respect to a limited number of embodiments, those skilled in the art, having the benefit of this disclosure, will appreciate that other embodiments can be devised which do not depart from the scope as disclosed herein. Accordingly, the scope should be limited only by the attached claims.

What is claimed is:

1. An apparatus for traveling assistance, the apparatus comprising:
    a camera mounted on a vehicle, provided to have a field of view outside the vehicle, and configured to provide image data; and
    a control unit configured to:
        identify lane marks on a road surface and a road marking between the lane marks based on processing the image data, the road marking including a sign displayed on the road surface to induce deceleration, and
        provide a traveling assist deceleration signal for controlling a braking device of the vehicle based on identifying the road marking.

2. The apparatus of claim 1, wherein the control unit is configured to provide the traveling assist deceleration signal based on identifying a diamond-shaped marking indicating a presence of a crosswalk ahead or an inverted triangle marking recommending yield driving in the marking information.

3. The apparatus of claim 1, wherein the control unit is configured to:
    generate marking information based on the road marking;
    change a warning timing related to autonomous emergency braking (AEB) to a second warning timing that is earlier than a predetermined first warning timing according to generating of the marking information; and
    control a display of the vehicle such that the display outputs a notification message for notifying a change in the warning timing.

4. The apparatus of claim 3, wherein the control unit is configured to:
    identify at least one of a pedestrian or another vehicle in a caution area within a predetermined distance from a position of the road marking based on processing the image data; and
    control the display such that the display outputs a warning message related to the AEB at the second warning timing in response to identifying at least one of the pedestrian or the another vehicle.

5. The apparatus of claim 4, wherein the control unit is configured to change the warning timing back to the predetermined first warning timing based on the vehicle having passed through the caution area.

6. The apparatus of claim 4, wherein the control unit is configured to provide an autonomous emergency braking signal based on a collision with at least one of the pedestrian or the another vehicle being predicted after the output of the warning message.

7. The apparatus of claim 4, wherein the control unit is configured to determine a crosswalk area, a lane merging area, or an intersection area as the caution area.

8. The apparatus of claim 4, further comprising a radar provided to have a sensing area outside the vehicle and configured to provide radar data,
    wherein the control unit is configured to further use the radar data to detect at least one of the pedestrian or the another vehicle.

9. The apparatus of claim 3, wherein the control unit controls the display such that the display outputs the notification message including at least one of text or a graphic element.

10. The apparatus of claim 3, wherein the control unit is configured to control a speaker of the vehicle such that the speaker outputs a voice notification message for notifying a change in the warning timing.

11. A method comprising:
acquiring image data by a camera that is mounted on a vehicle and provided to have a field of view outside the vehicle;
identifying lane marks on a road surface and a road marking between the lane marks based on processing the image data; and
providing a traveling assist deceleration signal for controlling a braking device of the vehicle based on identifying the road marking.

12. The method of claim 11, wherein the processing of the image data comprises identifying a diamond-shaped marking indicating a presence of a crosswalk ahead or an inverted triangle marking recommending yield driving.

13. The method of claim 11, further comprising generating marking information based on the road marking,
wherein the providing of the traveling assist deceleration signal comprises changing a warning timing related to autonomous emergency braking (AEB) to a second warning timing that is earlier than a predetermined first warning timing according to the generating the marking information, and
the method further comprising controlling a display such that the display outputs a notification message for notifying a change in the warning timing.

14. The method of claim 13, wherein the processing of the image data comprises identifying at least one of a pedestrian or another vehicle in a caution area within a predetermined distance from a position of the road marking, and
the controlling of the display further comprises outputting a warning message related to the AEB at the second warning timing in response to identifying at least one of the pedestrian or the another vehicle.

15. The method of claim 14, wherein the changing of the warning timing comprises changing the warning timing back to the predetermined first warning timing after the vehicle passes through the caution area.

16. The method of claim 14, wherein the providing of the traveling assist deceleration signal comprises providing an autonomous emergency braking signal in a case where a collision with at least one of the pedestrian or the another vehicle is predicted after the output of the warning message.

17. The method of claim 14, wherein the caution area is determined as a crosswalk area, a lane merging area, or an intersection area.

18. The method of claim 14, further comprising acquiring radar data from a radar that is provided to have a sensing area outside the vehicle,
wherein detecting at least one of the pedestrian or the another vehicle is performed by further using the radar data.

19. The method of claim 13, wherein the controlling of the display comprises outputting the notification message as at least one of text or a graphic element.

20. The method of claim 13, further comprising controlling a speaker provided inside the vehicle such that the speaker outputs a voice notification message for notifying a change in the warning timing.

* * * * *